United States Patent Office 3,008,143
Patented Nov. 14, 1961

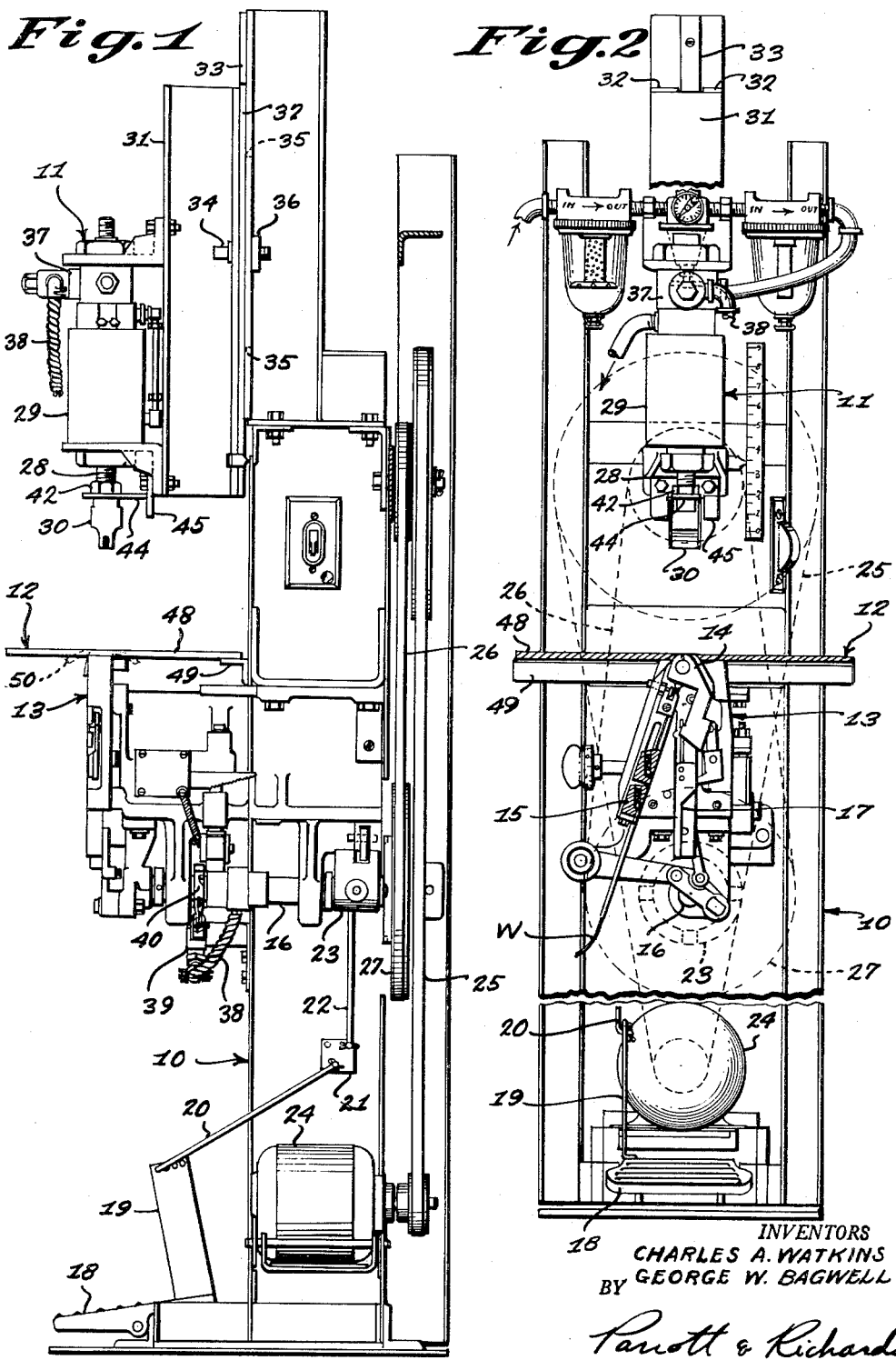

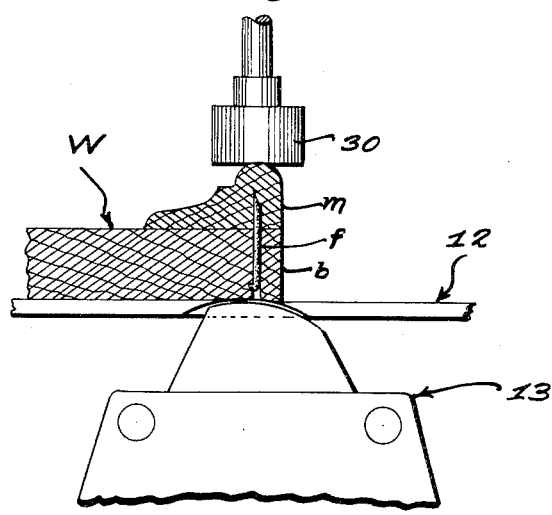
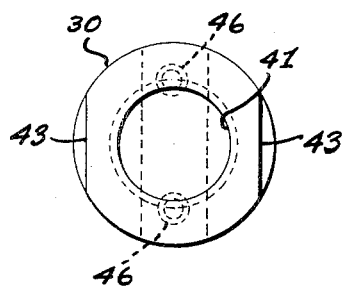
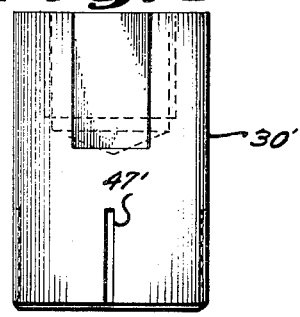
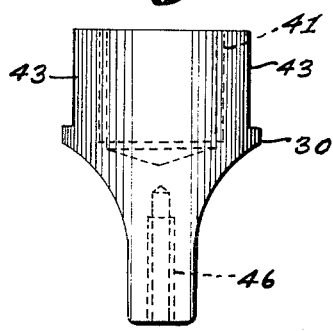
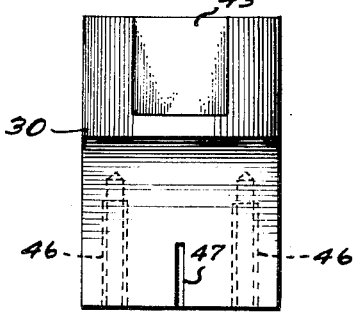

3,008,143
FASTENER FORMING AND INSERTING MACHINE
George W. Bagwell and Charles A. Watkins, Atlanta, Ga., assignors to The Auto-Soler Company, a corporation of Georgia
Filed Nov. 25, 1959, Ser. No. 855,373
3 Claims. (Cl. 1—29)

This invention relates to fastener forming and inserting machines of the type arranged for forming fasteners from a continuous length of wire and inserting the fasteners formed in work to be secured; and the machine of this type provided by the present invention is generally comparable to those disclosed in U.S. Patents No. 2,871,479 and No. 2,890,453, and is likewise arranged primarily for nailing use in connection with woodworking operations and the like.

In particular, however, the present invention provides a uniquely arranged machine of this type by which blind nailing may be accomplished in an exceptionally efficient and convenient manner, as described in detail below in connection with the accompanying drawings, in which:

FIG. 1 is a right side elevation of a fastener forming and inserting machine embodying the present invention;

FIG. 2 is a front elevation corresponding generally to FIG. 1;

FIG. 3 is a diagrammatic illustration of the blind nailing operation accomplished according to the present invention;

FIG. 4 is a plan view of the form of work clamping anvil employed advantageously according to the present invention;

FIG. 5 is a side elevation showing a selected body shape for the clamping anvil of FIG. 4;

FIG. 6 is an end elevation showing a modified body shape for the FIG. 2 clamping anvil; and FIG. 7 is a side elevation corresponding to FIG. 6.

Referring first to FIGS. 1 and 2 of the drawings, the illustrated embodiment of the present invention comprises generally a suitable frame structure 10 arranged to support an overhead work clamping mechanism 11 above a fixed work supporting means at 12 having an operating head 13 mounted thereunder for insertion of fasteners upwardly into work placed on the supporting means 12.

The operating head 13, as in the above noted prior patents, comprises a fastener forming knife assembly 14 to which wire $w$ is delivered in a continuous length by feeding means at 15, from a suitable reel supply (not shown), to have successive fasteners formed therefrom and inserted in work carried on the supporting means 12, as the operating head 13 is cyclically operated from a drive shaft at 16 by which a plunger member 17 is reciprocated to actuate the knife assembly 14 and effect driving insertion of the successive fasteners formed thereby.

For operation in this manner, the operating head 13 is disposed in inverted relation beneath the work supporting means 12, and the supporting means 12 is suitably apertured to allow disposition of the operating head 13 substantially flush with the top surface thereof so as to provide for driving insertion of fasteners vertically upward into work arranged thereon. The cyclic operation of the operating head 13 is controlled from a foot pedal 18 that is linked, through an angle arm 19 and connecting rod 20 to a pivot plate 21 from which an actuating rod 22 extends upwardly, to a clutch mechanism 23 arranged on the operating head drive shaft 16 for selective engagement, upon depression of the foot pedal 18, to connect the drive shaft 16 for rotation from a drive motor 24 through drive connections at 25 and 26 running to a pulley 27 adjacent the drive shaft clutch mechanism 23.

The previously mentioned overhead work clamping mechanism 11 comprises a piston element 28 of an air cylinder unit 29, the piston element 28 being aligned vertically with the reciprocating axis of the operating head plunger member 17, and being fitted at its downwardly extending end with a clamping or pressure anvil 30 through which work positioning clamping pressure may be exerted upon downward extension of the piston element 28 in opposed relation to the work supporting means 12.

Normally, as seen in FIGS. 1 and 2, the piston element 28 and the clamping anvil 30 carried thereon are retracted with respect to the work supporting means 12; and the air cylinder unit 29 is mounted on a slide member 31, having a pair of guide bars 32 fixed thereon for aligning disposition at each side of a vertical slide bar 33 fixed on the frame structure 10, for adjustable setting of the air cylinder unit 29 at a desired retracted spacing of the clamping anvil 30 above the work supporting means 12 in accordance with the shape of the work to be handled. Provision for fixing the air cylinder unit 29 at a selected vertical adjustment above the work supporting means 12 is made through an arrangement of clamping bolts 34 extending through the slide member mount 31 substantially midway of the length of each guide bar 32 thereon to ride in elongated slots at each side of the slide bar 33, as indicated by dotted lines at 35 in FIG. 1, and to engage clamping blocks 36 for tightening and thereby securing the slide member mount 31 at the desired fixed position on the frame structure 10.

Operation of the air cylinder unit 29 is accomplished through a conventional solenoid control as indicated at 37, which is connected electrically as indicated at 38 to a microswitch 39 arranged to have the switch arm thereof ride a cam element 40 carried on the operating head drive shaft 16 for rotation therewith and shaped for causing or actuating downward extension of the piston element 28 and clamping anvil 30 in phase with the fastener inserting portion of each cyclic operation of the operating head 13, so as to apply clamping pressure to work arranged on the supporting means 12 and thereby hold the work firmly in fixed position during the insertion of each fastener therein from the operating head 13.

The manner in which the foregoing arrangement of the present invention is employed for nailing operations is illustrated diagrammatically in FIG. 3 in which the work $W$ is illustrated as comprising a base member $b$ and a superimposed molding member $m$; the work $W$ being carried on the work supporting means 12 and having a fastener $f$ inserted upwardly therein from the operating head 13 for blind nailing the molding member $m$ to the base member $b$ while the work $W$ is held securely in place for this purpose by the opposed clamping pressure of the clamping anvil indicated at 30.

Such blind nailing operations are required frequently for securing decorative or functional trim such as the molding member $m$ on a base member $b$, as in the manufacture of drawer fronts and various furniture panel members and the like, and the blind nailing is essential in order to avoid objectionable marring of the superimposed trim. At the same time, however, it is necessary to locate the superimposed trim and hold it in properly located position during the blind nailing operation, and this necessity involves substantial difficulty and complication if the work pieces must be inverted for the blind nailing operation, so that the base member $b$ is uppermost and obscures the associated trim $m$ while the securing fasteners $f$ are inserted.

The arrangement of the present invention not only eliminates entirely this difficulty and complication in the blind nailing operation, but actually simplifies unusually the association and positioning of the work pieces in proper relation, so as to render the handling of the work W during the blind nailing operation extremely easy and efficient and thereby convert what has heretofore been characteristically a laborious and troublesome production step into one that may be accomplished at an exceptionally rapid rate and with the simplest of arrangements for locating the work pieces in proper relation for securing.

FIGS. 4 through 7 of the drawings illustrate in further detail possible arrangements of the clamping or pressure anvil 30 for use in particular instances. FIG. 4 is a plan view of a representative clamping anvil 30, showing a threaded bore 41 opening at the upper face thereof for removable engagement at the downwardly extending end of the piston element 28, which is likewise threaded and carries a lock nut 42 for fixing the engagement. Also, it will be noted that opposed flats 43 are formed at the sides of the clamping anvil 30 so that it may be held in proper position for tightening of the lock nut 32, and that a guide stem 44 is secured beneath the lock nut 42 for extension between vertical legs of a guide plate 45 to maintain the clamping anvil 30 and piston element 28 against rotation during their operating motion. In addition, it should be noted that the lower face of the clamping anvil 30 is formed with at least a pair of tapped holes 46 to allow securing thereat of a protective facing of leather or the like (not shown), if such a facing is required or desirable in handling particular work pieces.

Otherwise, the clamping anvil may have a body shape that is best adapted for the work pieces to be handled, FIG. 5 illustrating a clamping anvil 30' having a generally cylindrical body shape, with four gauge marks 47' spaced at 90° adjacent the lower edge thereof for convenient sight location of the work W being nailed. FIGS. 6 and 7 further illustrate an alternative form of clamping anvil 30, along the lines seen in FIGS. 1 and 2, in which the lower portion is relieved at opposite sides to form a rectangular work bearing portion that may be preferable in particular instances. Gauge marks 47 are again provided advantageously at the lower bearing portion of the anvil 30, as in the previously described embodiment.

The work supporting means 12 on which the work W is clamped during the blind nailing operation may also be arranged alternatively for accommodating the work W to the best advantage. Normally, this work supporting means will take the form simply of a table plate 48 fixed at a horizontal disposition on an angle bracket 49 and at the top of the operating head 13, as indicated in FIGS. 1 and 2. However, a curved or contoured plate, such as is indicated by dotted lines in FIG. 1, might alternatively be used for suiting the handling needs of specially shaped work.

The present invention has been described in detail above for purposes of illustration only and is not intended to be limited by this description or otherwise except as defined in the appended claims.

We claim:
1. In a fastener forming and inserting machine of the type arranged for forming fasteners from a continuous length of wire and inserting said fasteners in work to be secured, a fixed work support on which such work may be placed for insertion of fasteners therein, a shiftable pressure member comprising a piston element of an air cylinder unit disposed above said work support for movement in opposition thereto to clamp said work at a fixed position thereon, fastener forming and inserting means disposed below said work support and cylically operable for inserting fasteners upwardly into work on said work support in alignment with the opposed clamping action of said shiftable pressure member, and cam means actuated during the cyclic operation of said fastener forming and inserting means for causing movement of said shiftable pressure member to clamping relation with respect to work supported on said work support in phase with the fastener inserting portion of each cyclic operation to clamp said work in fixed position during the insertion of each fastener therein.

2. In a fastener forming and inserting machine, the structure defined in claim 1 and further characterized in that said shiftable pressure member is normally retracted with respect to said work support and is adjustably disposed for setting the retracted spacing thereof from said work support.

3. In a fastener forming and inserting machine, the structure defined in claim 1 and further characterized in that said piston element has the end thereof extending in the work clamping direction removably fitted with a clamping anvil.

References Cited in the file of this patent
UNITED STATES PATENTS

| | | |
|---|---|---|
| 2,027,122 | Sandt | Jan. 7, 1936 |
| 2,260,466 | Lancaster | Oct. 28, 1941 |
| 2,306,530 | De Wolfe | Dec. 29, 1942 |
| 2,871,479 | Wright | Feb. 3, 1959 |
| 2,881,439 | Dell | Apr. 14, 1959 |
| 2,890,453 | Wright | June 16, 1959 |
| 2,900,638 | O'Kelley | Aug. 25, 1959 |